(12) United States Patent
Jumpertz

(10) Patent No.: US 6,319,838 B1
(45) Date of Patent: Nov. 20, 2001

(54) LEVER ARM FOR A SCANNING MICROSCOPE

(75) Inventor: Reiner Jumpertz, Sunnyvale, CA (US)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/519,388

(22) Filed: Mar. 3, 2000

(30) Foreign Application Priority Data

Sep. 16, 1997 (DE) ................................................ 197 40 763

(51) Int. Cl.[7] .................................................... H01L 21/31
(52) U.S. Cl. ............................ 438/694; 438/745; 73/777
(58) Field of Search .................................... 438/689, 694, 438/745; 73/726, 727, 777

(56) References Cited

U.S. PATENT DOCUMENTS

| 5,386,720 | * | 2/1995 | Toda et al. ............................... 73/105 |
| 5,444,244 | * | 8/1995 | Kirk et al. ............................... 250/306 |
| 5,607,877 | * | 3/1997 | Matsuda et al. ...................... 437/180 |
| 5,658,815 | * | 8/1997 | Lee et al. ............................. 438/304 |
| 5,663,507 | * | 9/1997 | Westervelt et al. ..................... 73/727 |
| 5,788,763 | * | 8/1998 | Hayashi et al. ........................... 117/2 |

FOREIGN PATENT DOCUMENTS

0619872-B1 * 2/1997 (EP) .

* cited by examiner

*Primary Examiner*—Benjamin L. Utech
*Assistant Examiner*—Kin-Chan Chen
(74) *Attorney, Agent, or Firm*—Klaus J. Bach

(57) ABSTRACT

In a method of producing a lever arm with a tip for a scanning microscope wherein, in a wafer including a tip, a piezo-resistive resistance is implanted by means of C-MOS, a metallic layer is first deposited on the wafer, a photo lacquer layer is then deposited on the metallic layer, which photo lacquer layer is then structured, the metallic layer is etched away according to the structuring provided by the etching, and the wafer is bombarded by ions thereby implanting ions in the areas of the wafer from which the metallic layer was etched away and the metallic layer is then fully removed by a wet chemical process.

2 Claims, 4 Drawing Sheets

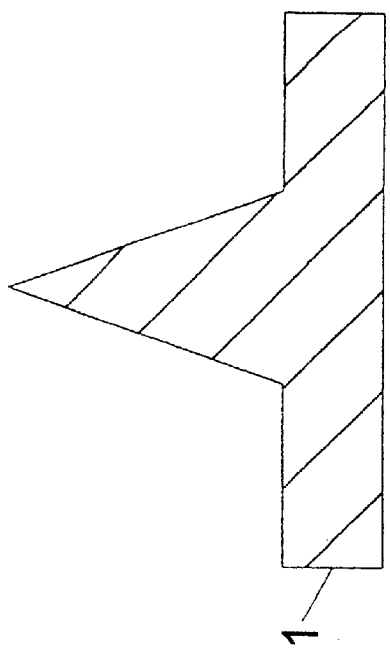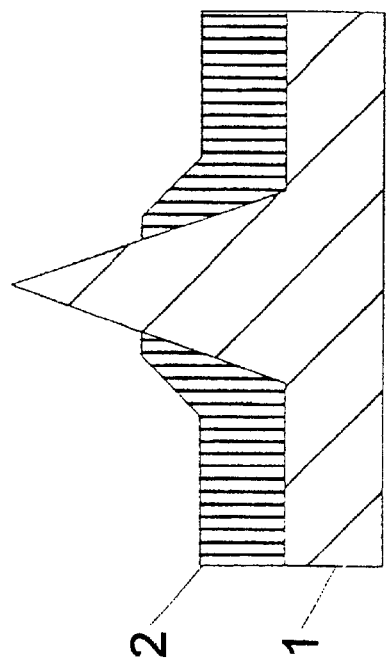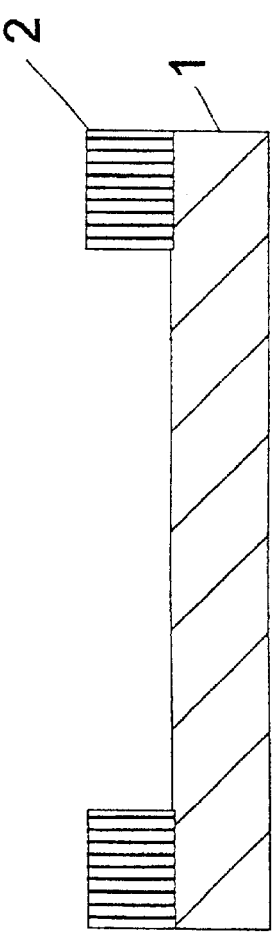

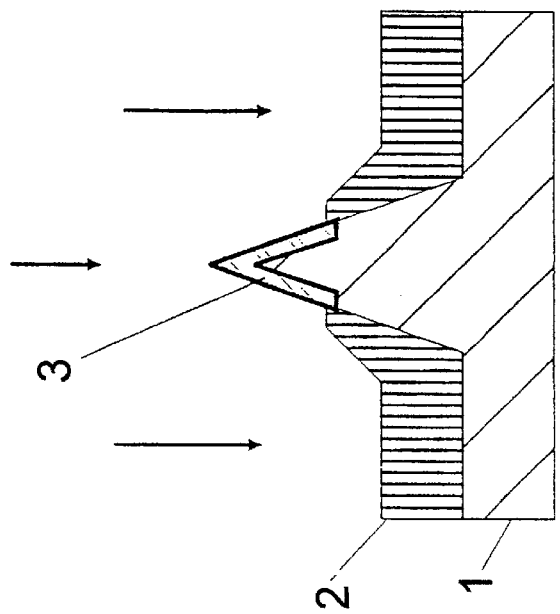
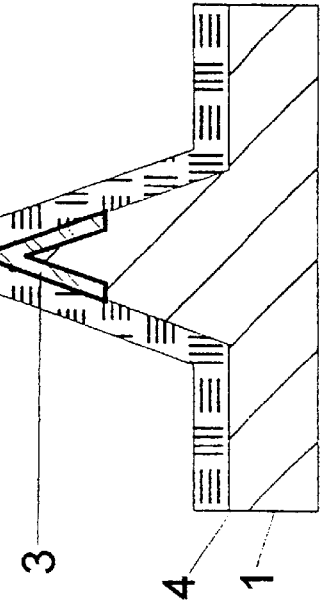
Fig. 2a'
Fig. 2b'
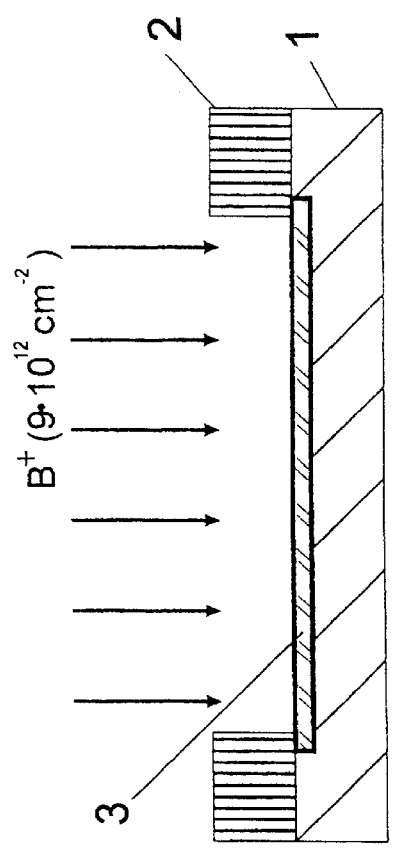
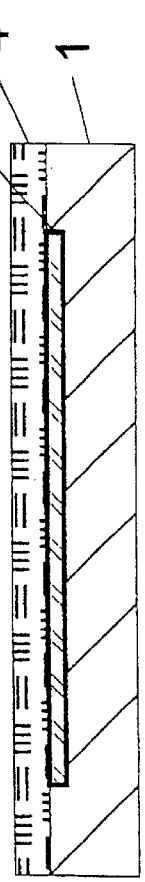
Fig. 2a
Fig. 2b

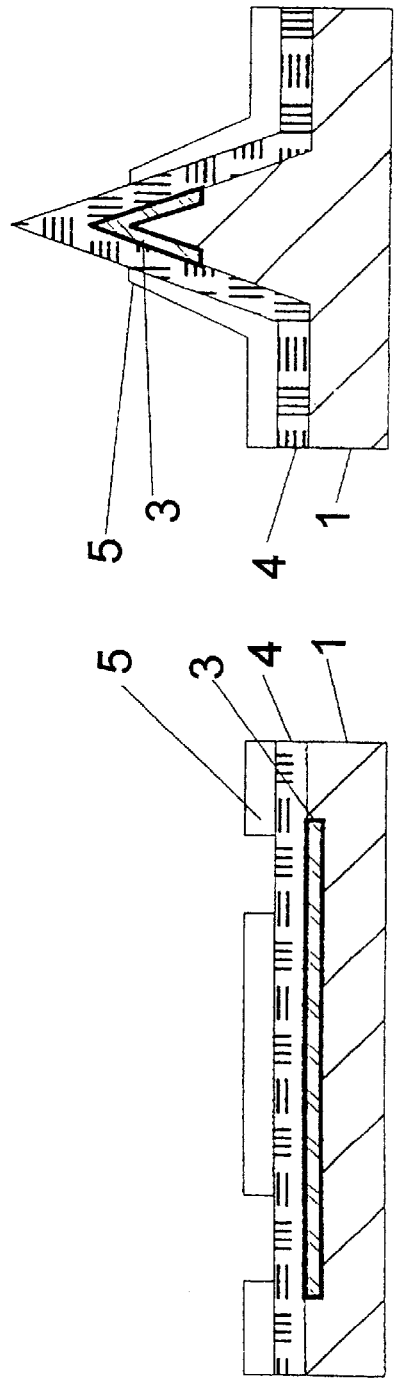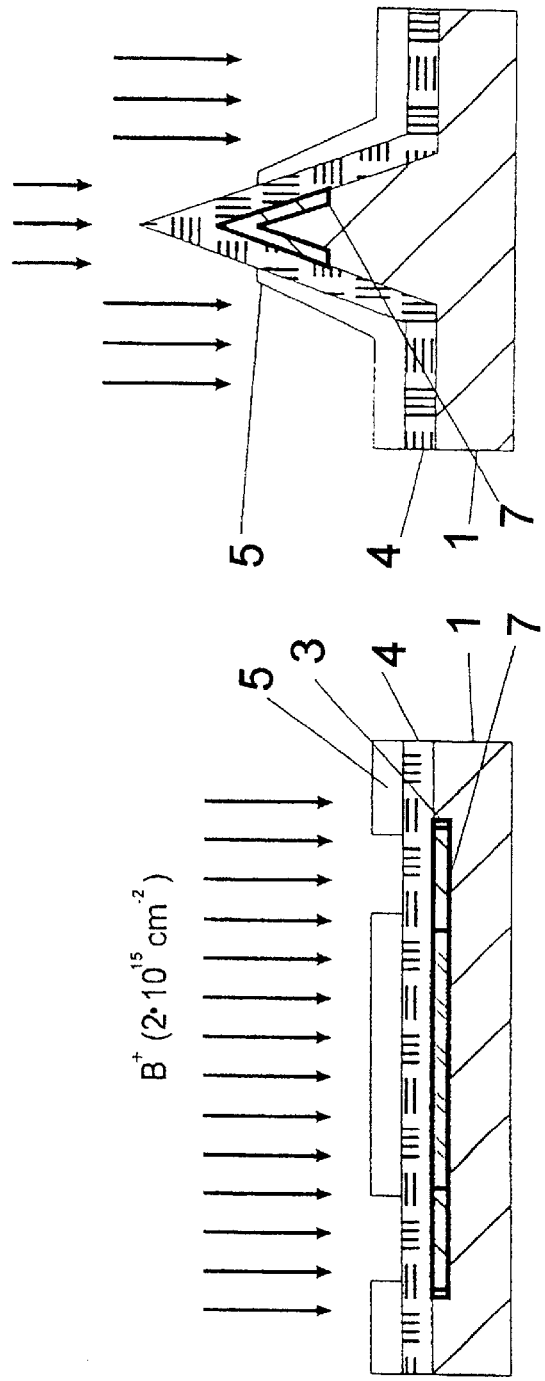

LEVER ARM FOR A SCANNING MICROSCOPE

BACKGROUND OF THE INVENTION

The invention relates to a method for producing a lever arm with a tip for a scanning microscope. The invention also resides in such a lever arm.

The patent publication EP 0 619 872 B1 and DE 44 37 306 C 2disclose lever arms for scanning microscopes, which include a piezo-resistive resistance integrated in the lever arm. The deflections of the lever arm change the resistance. The resistance change is a measure for the deflection. According to DE 44 37 306 C2, the piezo-resistive resistance is part of a MOSFET.

For the manufacturer of such a lever arm, the C-MOS technique may be employed, by way of which the resistances are implanted in chips as follows.

On a wafer consisting of a single-crystal silicon with a thin oxide layer on its surface a photo lacquer is deposited. The photo lacquer is partially exposed to light in a well-defined manner by using a mask and is developed and, in this way, partially removed. A window is formed in the enamel layer. The location the expanse (size) of the window corresponds to the location and the size of the piezo-resistive resistance to be implanted in the wafer. Subsequently, a beam of suitable ions such as boron—arsenic—or phosphorus ions is directed onto the lacquer layer including the window. In this way, ions are implanted in the wafer through the window in a spatially limited manner. Then the photolacquer is completely removed by solvents such as acetone.

In order to provide the resistance with electric contacts, a new photo lacquer layer is then applied. Windows are formed in the photo lacquer layer at locations where the resistance is to be connected to electric conductors. Through the windows for example boron ions are implanted. The dose is now substantially greater than the dose employed during the first implantation operation. The high dose is required for establishing a resistive contact with the implanted resistance. Otherwise, a semiconductor diode could be formed which is not desired. The enamel is again fully removed. A temperature treatment at temperatures of about 1050° C. is performed. The crystal structure damaged by the exposure to the ion radiation is cured in this way. After curing, the resistance implanted below the oxide layer has the desired piezo-resistive properties.

A new enamel layer is then applied. Windows are formed in the varnish at the predetermined contact locations. The oxide layer is removed in the area of the windows by chemical etching using hydrofluoric acid. Then the photo enamel is completely removed by solvents such as acetone. A metal layer is then applied over a large area. A photo lacquer varnish is deposited on the metal layer—a window is formed in the varnish. The location and size of the window are so selected that the metal layer can be separated, through the window, into two electrically separated areas. After separation of the metal layer into two areas, the contact locations are no longer electrically interconnected. By ion radiation etching, the metal is removed in the area of the window so that two isolated areas are formed. Then the photo lacquer is completely removed by solvents such as acetone.

The desired piezo-resistive resistance is now present in the wafer. A voltage can be applied to the implanted resistance by way of the metallic areas (conductor paths).

Subsequently, the wafer must be treated (for example, by etching) in such a way that it is shaped and sized properly for a lever arm of a scanning microscope. Finally, the tip is cemented to the lever arm by hand.

The method for the manufacture of a piezo-resistive resistance in a wafer as described before is relatively inexpensive. However, the manual cementing of the tip makes the process substantially more expensive.

With the method described above, it is impossible to implant a piezo-resistive resistance in a lever arm-like wafer, which is already provided with a tip.

With this method, the tip as well as the fragile lever arm would be destroyed. It is for example, impossible to protect the tip by means of a photo lacquer since the lacquer layer comes loose at the tip. Subsequent ion beam etching would therefore damage the tip.

The tip is furthermore damaged by oxidation at temperatures of 1000° C. and more. Also, thermal tensions could destroy the fragile tip.

For technical reasons, a lever arm etched out of a conventional wafer has a relatively uneven surface. Photo lacquer layers cannot be applied with uniform thickness on an uneven surface. Areas with such thin photo lacquer layers that they cannot withstand requirements can therefore not be avoided. For example, very thin areas can be damaged by the subsequent ion irradiation to such an extent that the lacquer cannot be removed by exposure to light and development or by a solvent.

It is the object of the present invention to provide a comparably inexpensive method of manufacturing a lever arm of the type referred to above as well as such a lever arm.

SUMMARY OF THE INVENTION

In a method of producing a lever arm with a tip for a scanning microscope wherein, in a wafer including a tip, a piezo-resistive resistance is implanted by means of C-MOS, a metallic layer is deposited on the wafer, a photo lacquer layer is then deposited on the metallic layer, which photo lacquer layer is then structured, the metallic layer is etched away according to the structuring provided by the etching, and the wafer is bombarded by ions thereby implanting ions in the areas of the wafer from which the metallic layer was etched away and the metallic layer is then fully removed by a wet-chemical process.

In accordance with the invention, a piezo-resistive resistance is implanted into a wafer including a tip by C-MOS. The wafer may be present already at the beginning of the method in the form of a fragile lever arm. But it is also possible to provide this form for the wafer, for example, by a final etching step.

C-MOS is any method which includes the following method steps: A photo lacquer is deposited as a layer on a surface of an article. At least one window is formed in the photo lacquer. Ions are implanted into the predetermined areas delimited by windows or material is removed from the article or deposited on the article.

As claimed, a metallic layer covering the tip is deposited on the wafer, if the tip must be protected in the subsequent step for example from ion radiation etching or if a photo lacquer to be deposited may be thoroughly damaged during subsequent exposure to ions because of the unavoidable formation of thin areas.

In this way, damages at the tip or to the wafer are avoided, since the metal can hardly be damaged by exposure to ion radiation and does not come loose at the tip in contrast to the photo lacquer. Photo lacquer, which is damaged throughout can be removed together with the metallic layer. In this way, no damages will remain because of photo lacquer, which is damaged throughout.

In the metal layer, windows can generally be, and are, formed in order to limit a subsequent deposition or removal or a doping to the area which is delimited by the windows.

The metal is so selected that it can be etched away by a wet chemical procedure. It is therefore possible to completely remove damaged photo lacquer, which is disposed on the metal layer selectively and completely and in a simple manner without damaging the wafer or the tip.

With wet chemical etching, the etching in liquids such as acids or bases is to be understood. Distinctive therefrom is for example the etching by ion radiation wherein material is physically removed. Ion radiation etching is not comparable with bombarding.

If the wafer is present as a fragile lever arm already at the beginning of the process, it is important that thermal tensions are avoided. If the wafer is present in the form of a fragile lever arm, destructive temperatures (above 1000° C.) must be especially avoided.

For example, an article is produced from a conventional wafer by etching which article has the shape of a lever arm with a tip for a scanning microscope.

The lever arm-shaped wafer may, in the beginning, have an oxide layer on its surface.

The wafer consists, for example, of a single-crystal silicon or of III–V- semiconductors. The tip and the wafer consist of a single part. They are integral.

In a first method step for example, the surface to be treated is first covered by a photo lacquer. The photo lacquer comes loose at the tip. The tip is unprotected.

In the lacquer layer, a window is formed where the resistance is to be implanted in the wafer.

Ions are then implanted in the wafer through the window, for example, boron ions. The dose may be $9 \times 10^{12}$ ions per square centimeter. The unprotected tip is, by the implantation of boron ions with a comparably lower dose, not damaged to such a degree that it becomes unusable for later use in a scanning microscope. There is no sputter process involved. The dose is furthermore so small that the lacquer is not damaged throughout in the thin areas. A protective metallic layer between the wafer and the lacquer as defined in the main claim is therefore not absolutely necessary.

Subsequently, the photo layer is removed. If there is an oxide layer, which has been damaged by the ion implantation, it can be removed chemically by hydrofluoric acid. The etching with hydrofluoric acid is relatively selective with respect to silicon. That is silicon is attacked by the hydrofluoric acid to only a relatively small degree. It is possible in this case to control the etching process so accurately that the tip is not damaged.

Then a (new) oxide layer is formed on the surface of the wafer for example in the following way. The wafer is exposed in an oxygen atmosphere sufficiently long to relatively low temperatures of for example 900° C. Temperatures of 900° C and less do not detrimentally affect the wafer with the tip.

The (new) oxide layer formed in this manner ensures a good electric isolation of the resistance implanted under the oxide layer and permits, for example, the development as a MOSFET in the manner as disclosed in DE 44 37 306 C1. The piezo-resistive resistance is then part of the MOSFET.

In the next method step, the surface of the wafer is coated with a metal which can be wet-chemically etched away. Particularly, chromium is suitable. Suitable metals are further, for example, tungsten, gold as well as aluminum. In contrast to a photo lacquer layer the metal layer does not come loose at the tip. The tip is therefore completely covered by the metal layer and is protected.

The metal layer is preferably at least 200 nm thick, in order to reliably provide for the desired protection effects.

A photo lacquer is deposited on the metal layer in the form of a layer. At the locations where the electric contact with the implanted resistance is to be established, windows are formed. In the area of the windows as well as at the tip which is not protected by the photo lacquer, the metal is etched away.

If the metal layer consists of chromium, the metal can be removed by chromium etching material.

The windows in the photo lacquer then extend also through the metal layer. The photo lacquer is subsequently removed.

Ions, that is, particularly boron ions, are implanted in the wafer through the windows. Now the implantation rate is to be selected to be high in order to be able to establish an ohmic contact with the piezo-resistive resistance. The implantation rate is here for example $2 \times 10^{15}$ ions per square centimeter. In this way, a $p^{++}$-doped range can be formed in the wafer as far as it is not covered by a protective layer.

The metal layer provided in accordance with the method can, practically not be damaged by ion bombardment—in contrast to a lacquer layer. A lacquer layer damaged throughout by ions could not have been removed by light exposure and development or be solvents which is a disadvantage. Damages to the wafer would have been unavoidable.

The surface of the lever arm is uneven in comparison with the conventional wafers mentioned initially. If the photo lacquer would have been deposited on the wafer without a metallic intermediate layer, the photo lacquer layer would have been very thin in places because of the unevenness of the wafer surface. The following strong ion bombardment could have damaged the photo lacquer throughout. At the places, which were damaged throughout, removal of the photo lacquer would not be possible without damage to the wafer.

The problem pointed out above is solved by providing a metallic intermediate layer. Although it is possible that the photo lacquer deposited on the metal layer is also damaged because of thin areas so that it can no longer be removed for example by solvents. However, a damaged part can be etched away together with the metal layers without any problems.

After the metal and the photo lacquer layer have been removed a heating procedure is introduced at about 900° C.

In the next step, the oxide layer is etched away in the areas of the windows for example by hydrofluoric acid. In this way, recesses are formed which extend into the implanted layer below the oxide layer.

Subsequently, electric conductors are formed which extend into the recesses up to the implanted resistance.

For forming the electric conductors, a large area metal layer is first deposited. Then a photo lacquer is applied. In the photo lacquer, a window is so formed that the metallic layer can be removed in a suitable manner, for example, by ion radiation etching. The metal layer is then removed not only in the area of the windows, but as desired also from the tip which is not protected by photo lacquer.

It is advantageous if, in the manufacture of the conductors described above, a metal is used which can be etched away in a wet chemical process. The metal is then removed using a wet chemical process instead of ion radiation etching.

Wet chemical etching is possible in this case since the metal layer is only very thin so that etching extends practically only into the depth. Wet chemical etching permits a selective etching—in contrast to ion radiation etching. As a result, in contrast to ion radiation etching, the material is not damaged in an undesired manner. The metal layer can be completely removed from the tip without problems and without damage to the tip. In addition, this process is inexpensive and fast.

Alternatively, a lacquer layer may be first deposited, and windows are formed in the lacquer layer corresponding to the predetermined pattern of the conductors. Over a large area, a metal layer consisting of, for example, nickel or titanium and aluminum is deposited. The lacquer is washed away with the metal layer disposed thereon, that is, the photo lacquer is dissolved by solvents such as acetone and removed in this manner. The desired metallic conductor pattern and also a metallic coating of the tip remain in place.

A metallic ferromagnetic coating of the tip of a lever arm for a scanning microscope may increase the resolution advantageously as can be seen for example from the printed publication WO 96/37788.

With the method according to the invention, the tip remains intact in contrast to the conventional C-MOS process.

The method according to the invention is comparatively simple and, as a result, inexpensive. As far as complicated technical equipment is concerned apparatus for performing altogether three lithographic steps, an oxidation furnace for performing at least an oxidation step and implantation equipment for executing two ion implantation steps. The method can be fully automated.

It is to be understood that the method does not need to be performed in the order as described. Variations and additional measures are possible.

Care has to be taken that the processes mentioned earlier which are destructive to the tip and, if applicable, to the fragile lever arm predetermined for use in a scanning microscope, are avoided in accordance with the invention as claimed.

The object of the invention is further solved by a lever arm manufactured in accordance with the method of the invention. The lever arm and tip consist of a single piece. They are integral. The piezo-resistive resistance is connected to metallic conductive paths.

Below, the method according to the invention is described based on the drawings.

BRIEF DESCRIPTION OF THE DRAWINGS

FIG. 1a shows a cross-sectional view of a single-crystal Si substrate,

FIG. 1a' shows the Si substrate with a tip,

FIG. 1b shows the Si substrate with a photo laqcuer layer disposed thereon,

FIG. 1b' shows the Si substrate with a tip and a photo lacquer layer disposed thereon, FIG. 2a shows the substrate being bombarded by $B^+$ ions forming a p-doped layer, FIG. 2a' shows the substrate with a tip being bombarded for the implantation of $B^+$ ions, FIG. 2b shows the substrate with a $SiO_2$ layer disposed on the wafer, FIG. 2b' shows the substrate with a tip and a $Sio_2$ layer disposed thereon.

DETAILED DESCRIPTION OF AN EMBODIMENT

Figure 3A:
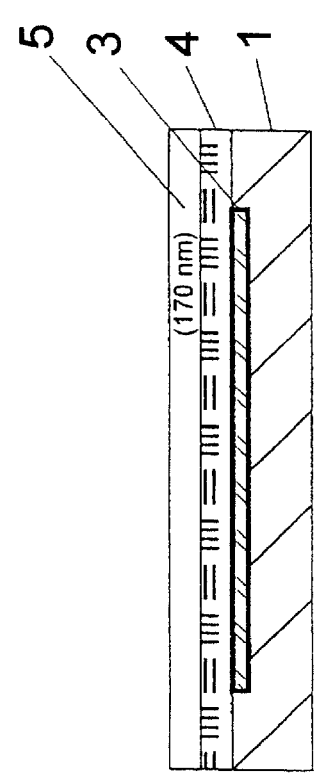
FIG. 3a shows the substrate with a tip and a chromium layer disposed on the $SiO_2$ layer, FIG. 3a' shows the substrate with a top and a chromium layer disposed on the $Sio_2$ layer.
Figure 3A:
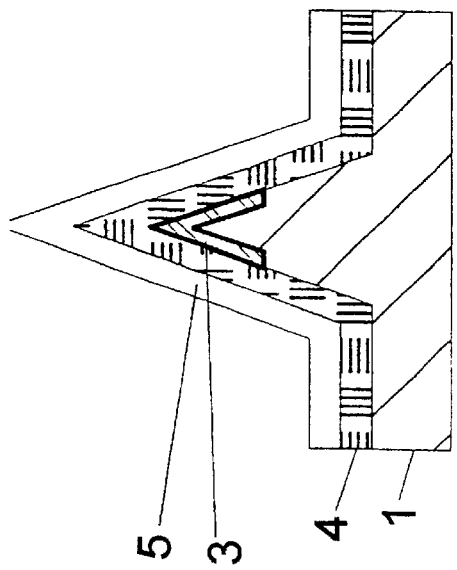

FIGS. 1a, 1A' show in a cross-sectional view a single crystal Si substrate 1 with a tip and a (100) surface. The substrate has the shape and the dimensions of a lever arm for a scanning microscope.

In accordance with FIGS. 1b, 1b' a photo lacquer 2 is deposited on the (100) surface by a spin-on technique at high speeds of 2000 to 4000 revolutions per minute. The photo lacquer is released in this process drop-wise by a pipette or it is poured on. The lacquer is thrown outwardly by the rotation. In this way, the desired lacquer layer is formed.

The area for forming the resistance is exposed to light and is developed. In this way, a window is formed in the lacquer layer 2. The tip does not remain covered by the lacquer layer since the lacquer comes off the tip.

In the next step, the substrate according to FIGS. 2a, 2a' is bombarded by $B^+$ ions. The dose is $9\times10^{12}$ $cm^{-2}$. In the area of the surfaces not protected by the lacquer 2, p-doped layers 3 are formed in which $B^+$ ions are implanted.

The lacquer 2 is removed and, in accordance with FIGS. 2b, 2b', a $SiO_2$ layer 4 is then formed on the surface of the wafer. The oxidation layer 4 serves to insulate the conductor path and for the manufacture of a MOSFET.

In the next step in accordance with FIGS. 3a, 3a' a 170 mm thick chromium layer 5 is deposited on the oxide layer 4 for example by electron beam vapor deposition. The chromium layer covers also the tip.

Figure 3B:
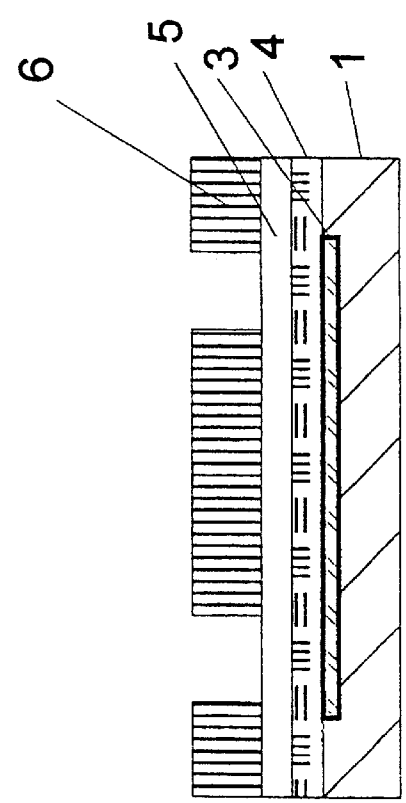
FIG. 3b shows a photo-lacquer layer disposed on the chromium layer, FIG. 3b' shows a photo layer disposed on the chromium layer of the structure, which includes a tip, FIG. 4a and FIG. 4a' show part of the photo-lacquer layer removed by etching, and FIG. 4b and FIG. 4b' show the wafer again bombarded by $B^+$ ions.
Figure 3B:
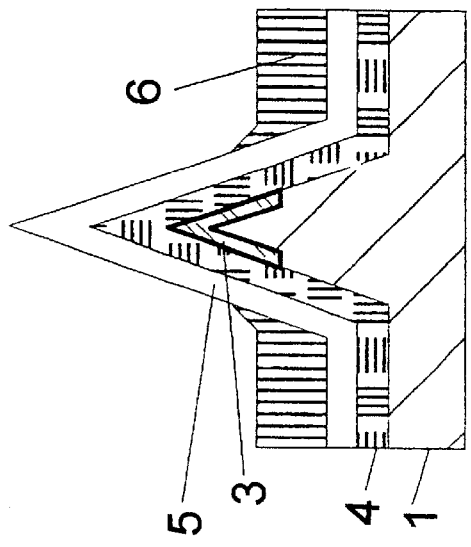

A new photo lacquer layer 6 is deposited on the chromium layer 5. In the new photo lacquer layer 6, windows are formed in the manner as apparent from FIG. 3b by exposure to light and development in those areas where the electric contacts to the p-doped layer 4 are to be established.

Again, the tip can not be covered by a photo lacquer.

The chromium layer 5 is removed in the areas, which are not covered by photo lacquer by wet-chemical etching for example by chromium etching. Subsequently, the photo lacquer 6 is removed. Then the state as shown in FIGS. 4a, 4a' is present.

In accordance with FIGS. 4b, 4b', the wafer is again bombarded by $B^+$ ions. This time, the dose is $2\times10^{15}$ $cm^{-2}$. As a result, $p^{++}$-doped layers 7 are formed below the oxide layer 4.

Any lattice faults are healed by temperature treatment at non-destructive temperatures. Metallic conductor paths, which contact the p-doped layer 3 at the $p^{++}$-doped contact areas 7 can now be formed in the manner as described.

In particular, the implanted piezo-resistive resistance 3 now present is utilized to form a MOSFET.

What is claimed is:

1. A method of producing a lever arm with a tip for a microscope, comprising the steps of: providing a single crystal wafer in the form of a lever arm including a tip projecting upwardly from the surface of the lever arm at one end thereof, depositing a photolacquer layer on said wafer, whereby the surface of said wafer is covered except for said tip on which the photolacquer layer does not remain, exposing an area of said photolacquer layer where a resister is to be formed on said wafer to light and developing said photolacquer layer to form a windows in said area, subjecting said wafer to a bombardment of $B^+$-ions for implantation to form a p-doped resist layer in the exposed window area and the tip of said wafer which is not protected by said photolacquer layer, removing said photolacquer layer and forming an Si-oxide layer on said wafer, depositing a metal layer on said wafer which covers said Si oxide layer and also said tip, depositing another photolacquer layer on said metal layer wherein said tip remains again uncovered, forming windows into said another photolacquer layer by selective exposure to light where contacts to the resist layer are to be formed and developing those areas, etching away the metal in those areas not covered by said another photolacquer layer, bombarding the wafer by $\beta^+$ ions to form $p^{++}$ doped areas in those areas not protected by said metal layer, and removing the metal layer by a wet chemical procedure.

2. A method according to claim 1, wherein a wafer consisting of a single-crystal silicon is used and any temperature treatment is preformed below 1000° C.

* * * * *